United States Patent
Lynn et al.

(10) Patent No.: US 11,424,713 B1
(45) Date of Patent: Aug. 23, 2022

(54) METHOD TO CONTROL AN INVERTER AND INVERTER WITH IMPROVED CONTROLS

(71) Applicant: Franklin Electric Co., Inc., Fort Wayne, IN (US)

(72) Inventors: Douglas C. Lynn, Fort Wayne, IN (US); Shengnan Li, Fort Wayne, IN (US); Richard J. Halsey, Fort Wayne, IN (US)

(73) Assignee: FRANKLIN ELECTRIC CO., INC., Fort Wayne, IN (US)

( * ) Notice: Subject to any disclaimer, the term of this patent is extended or adjusted under 35 U.S.C. 154(b) by 436 days.

(21) Appl. No.: 15/983,802

(22) Filed: May 18, 2018

Related U.S. Application Data

(60) Provisional application No. 62/508,993, filed on May 19, 2017.

(51) Int. Cl.
| | |
|---|---|
| *F04B 49/06* | (2006.01) |
| *H02P 29/68* | (2016.01) |
| *H02P 27/08* | (2006.01) |
| *H02M 1/36* | (2007.01) |
| *H02M 7/5387* | (2007.01) |
| *F04B 35/04* | (2006.01) |

(52) U.S. Cl.
CPC .............. *H02P 29/68* (2016.02); *H02M 1/36* (2013.01); *H02M 7/53871* (2013.01); *H02P 27/08* (2013.01); *F04B 35/04* (2013.01); *H02P 2201/03* (2013.01)

(58) Field of Classification Search
CPC .......... H02P 29/68; H02P 27/08; H02M 1/36; H02M 7/53871; H02M 2001/327; F04B 35/04
USPC ...................................... 318/400.08; 700/275
See application file for complete search history.

(56) References Cited

U.S. PATENT DOCUMENTS

| | | | |
|---|---|---|---|
| 2006/0280018 A1* | 12/2006 | Cases .................. | G06F 13/4072 365/226 |
| 2009/0092501 A1* | 4/2009 | Seibel ..................... | F04B 35/04 700/275 |
| 2014/0238978 A1* | 8/2014 | Kitaizumi ............ | H05B 6/1236 219/667 |
| 2017/0244240 A1* | 8/2017 | Watanabe ................ | H03K 7/08 |
| 2017/0259846 A1* | 9/2017 | Koseki .................. | H02P 29/032 |
| 2018/0048140 A1* | 2/2018 | Takuma .................. | B60R 16/02 |

\* cited by examiner

*Primary Examiner* — Muhammad S Islam
*Assistant Examiner* — Zemenay T Truneh
(74) *Attorney, Agent, or Firm* — Faegre Drinker Biddle & Reath LLP

(57) ABSTRACT

A motor drive including an inverter and control logic and a method implemented by the control logic to protect an inverter. The method includes determining a temperature value of a temperature associated with the inverter; preventing restarting of the inverter if the temperature value exceeds a first temperature threshold; and preventing restarting of the inverter if the temperature value exceeds a second temperature threshold that is smaller than the first temperature threshold and the inverter was shut down due to a high load condition.

15 Claims, 2 Drawing Sheets

METHOD TO CONTROL AN INVERTER AND INVERTER WITH IMPROVED CONTROLS

CROSS-REFERENCE TO RELATED APPLICATIONS

The present application claims the benefit of U.S. Patent Application No. 62/508,993 filed May 19, 2017, which is incorporated by reference herein in its entirety.

FIELD OF THE DISCLOSURE

The disclosure relates generally to an inverter with thermal protection features.

BACKGROUND OF THE DISCLOSURE

A motor drive generates motor voltages to control the speed of a motor coupled to a load. The load may comprise a variable torque or a constant torque load. Example loads include pumps, fans, compressors, vehicles, conveyors, material processing machines such as extruders, blenders, dryers, printers, and others. Example pumps comprise vacuum pumps, submersible pumps, surface pumps, centrifugal and progressive cavity pumps, and any other mechanical device rotatably operable to transfer fluids. Pumps are used in many applications, including liquid pumping applications, heating, ventilation and air conditioning (HVAC) applications, cooling tower applications, and others.

An example of a motor drive is a variable frequency drive (VFD). A VFD comprises a converter coupled to an inverter by a DC-link. The inverter receives direct-current (DC) power from the DC-link and generates single or multi-phase alternating-current (AC) voltages at desired frequencies to drive a motor. In a VFD, control logic determines the desired frequency based on parameters of the application in which the motor is used. Inverters are also used in many other applications to generate voltages having constant or variable frequencies. Examples of applications in which inverters are used include emergency backup power; aircraft systems, renewable energy systems to supply power to the electrical grid, and any other application which requires converting DC power to AC power. Many applications of inverters are critical.

It would be desirable to extend the operating life and reduce the acquisition and repair costs of inverters.

SUMMARY

In some embodiments, an alternating-current (AC) motor drive is provided comprising: an input connectable to a power source and an output connectable to an AC motor; a direct current (DC) link; an inverter including power switches electrically coupled to receive a DC power from the DC link and operable to control an output AC power available at the output to supply the AC motor; a drive controller configured to generate a command signal to drive the AC motor at a variable speed based on a process variable and a process setpoint; a power module comprising a modulation controller communicatively coupled to the drive controller and power switches configured to modulate the DC link voltage into the output voltage responsive to the command signal, wherein the drive controller comprises temperature control logic configured to compare a temperature value to a first temperature threshold and to prevent restarting of the inverter if the temperature value exceeds the first temperature threshold, and to compare the temperature value to a second temperature threshold that is smaller than the first temperature threshold and prevent restarting of the inverter if the temperature value exceeds the second temperature threshold and the inverter was shut down due to a high load condition.

In additional embodiments, an alternating-current (AC) motor drive is provided comprising: a converter; a DC link electrically connected to the converter; an inverter; and a drive controller configured to control the inverter and including temperature control logic configured to compare a temperature value to a first temperature threshold and to prevent restarting of the inverter if the temperature value exceeds the first temperature threshold, and to compare the temperature value to a second temperature threshold that is smaller than the first temperature threshold and prevent restarting of the inverter if the temperature value exceeds the second temperature threshold and the inverter was shut down due to a high load condition.

In further embodiments, a method to protect an inverter is provided, the method comprising: by control logic operable to control the inverter: determining a temperature value of a temperature associated with the inverter; preventing restarting of the inverter if the temperature value exceeds a first temperature threshold; and preventing restarting of the inverter if the temperature value exceeds a second temperature threshold that is smaller than the first temperature threshold and the inverter was shut down due to a high load condition.

DESCRIPTION OF THE DRAWINGS

The features and advantages of the disclosure will become more readily appreciated as the same become better understood by reference to the following detailed description when taken in conjunction with the accompanying drawings, where.

Figure 1:
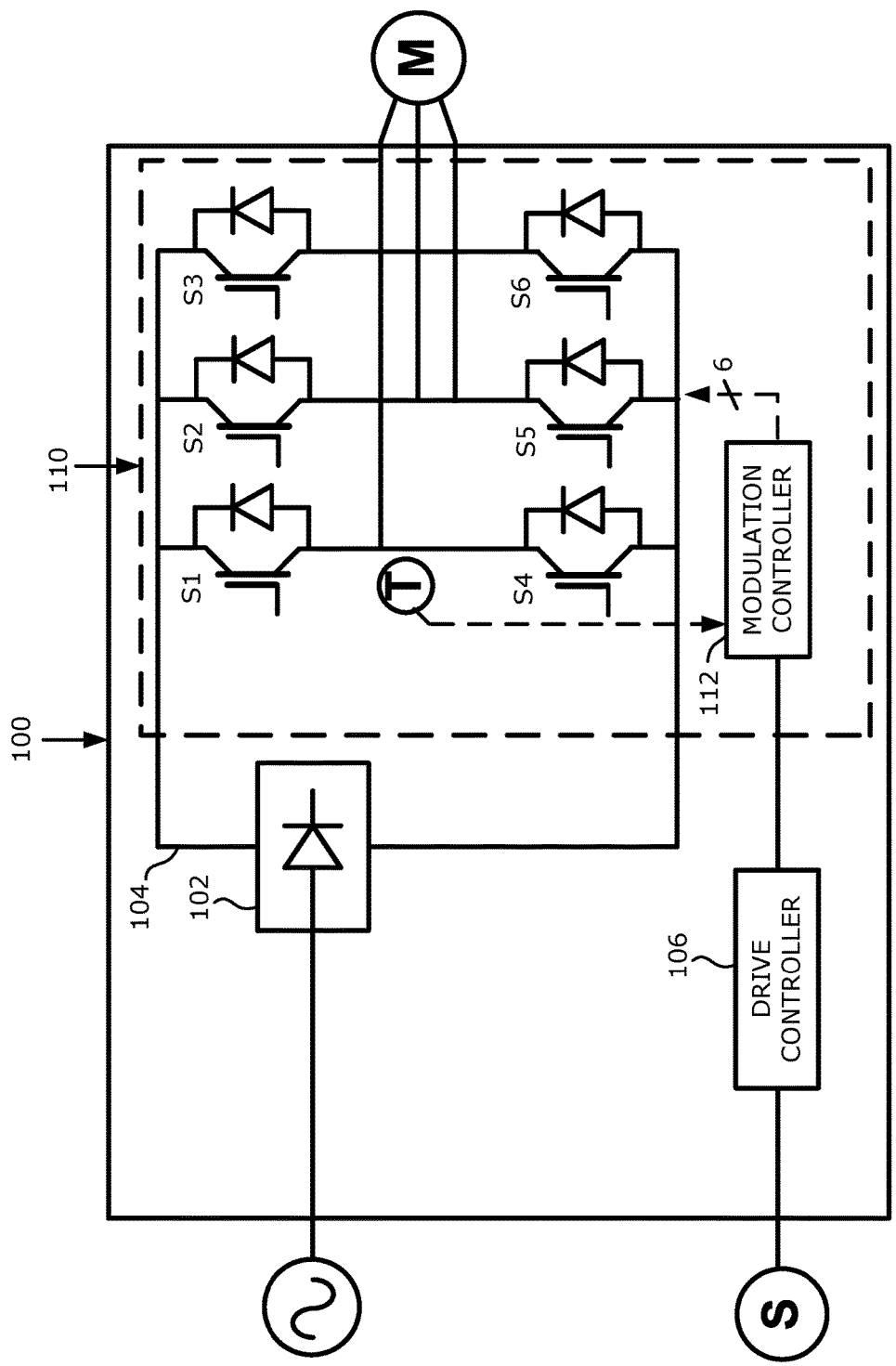
FIG. 1 is a schematic view of a motor drive including an inverter.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention.

DETAILED DESCRIPTION OF DISCLOSED EMBODIMENTS

For the purpose of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. No limitation of the scope of the invention is thereby intended.

Except where a contrary intent is expressly stated, terms are used in their singular form for clarity and are intended to include their plural form.

Occurrences of the phrase "in one embodiment," or "in one aspect," herein do not necessarily all refer to the same embodiment or aspect.

Embodiments of the disclosure, and others, will now be described with reference to the figures. FIG. 1 is a schematic representation of a VFD 100 comprising a rectification circuit 102 coupled to an inverter 110 by a DC link 104. Rectification circuit 102 receives AC power from a source and converts the AC power to DC power. Inverter 110 includes a plurality of power switches S1-S6 and gate control logic 112. Rectification circuit, or converter, 102 then conveys the DC power via current bus or DC-link 104 to power switches S1-S6. Converter 102 may be an active or passive converter. Drive controller 106 receives process feedback from a sensor S and generates, then transmits, waveform control signals to modulation controller 112, which converts, then transmits, gate control signals to power switches S1-S6 to generate AC voltage with the commanded voltage and frequency. The waveform control signals are configured by drive controller 106 to control a parameter of a motor M coupled to VFD 100. Examples of control parameters include pressure, torque, temperature, flow, and any other variable that can be affected by operation of motor M. Generally, but not necessarily, modulation controller 112 generates pulse-width-modulated gate control signals. The power switches may be modulated at rates exceeding 2 KHz and generate heat as a result. Process regulation logic comprised in drive controller 106 to monitor the process sensor and generate a speed reference to control the speed of the motor M are well known in the art. Generally, such logic comprises a PID control loop to determine a response time that is sufficiently responsive but also stable. Voltage and current sensors (not shown) are provided to monitor the performance of and protect the system.

Inverter 110 can be sized to satisfy or exceed the electrical current requirements of the load. Larger power switches can handle higher currents for longer periods of time than smaller switches, but they also increase the size and cost of inverter 110. Smaller power switches are less expensive and smaller but might not withstand the loads that larger switches can carry.

In some embodiments, inverter 110 comprises a sensor configured to sense the temperature of a junction of the power switch. The junction is formed between doped silicon layers and is controlled by a gate structure driven by the modulation control signals, as is well known in the art. An example of a power switch is an insulated-gate bipolar transistor (IGBT). An IGBT has four alternating layers (P-N-P-N). The junction temperature provides faster and more accurate temperature feedback than other temperature sensors, although other sensors may be used. Examples of temperature sensors include thermocouples, resistance temperature detectors (RTD) sensors, infrared sensors, and any other sensor capable to provide temperature feedback. An inverter may be provided in a power module comprising the power switches and a temperature sensor structured to sense junction temperatures. A temperature sensor may also be thermally coupled to a base of the power module or to a heatsink mounted to the power module to extract heat therefrom. In another example the temperature sensor is connected to sense the temperature of air in the enclosure housing the inverter.

Conditions arise during operation of the inverter which cause the inverter to overheat. The temperature control logic may comprise logic to monitor a temperature of the inverter using the sensors described above. In another example, the inverter comprises logic to shut the inverter down and provides a fault signal sensed by drive controller 106. Further, drive controller 106 may shut down the inverter based on a fault determined by drive controller 106. Example faults include overcurrent, power high limit, high torque, high temperature, and any other combination of input variables intended to signify a high load condition, which may be referred to herein as high load faults. A high load fault may, for example, result from a locked-rotor condition or a ground fault. The temperature control logic may determine that a high load fault occurred based on the fault signal from the inverter or from a fault status determined by drive controller 106.

The temperature control logic includes a temperature lockout algorithm. In one embodiment, the temperature control logic is configured to compare a temperature value to a first temperature threshold and to prevent the inverter from restarting if the temperature value exceeds the first temperature threshold. The temperature control logic is also configured to compare the temperature value to a second temperature threshold that is smaller than the first temperature threshold and prevent the inverter from restarting if the temperature value exceeds the second temperature threshold and the cause of the inverter shut down is a high load fault. As used herein, shutting down or stopping and restarting refers to the inverter being controlled to prevent or to restart outputting power. While the inverter is stopped it may still receive power and control logic may still operate to monitor parameters related to operation of the inverter, but the power switches of the inverter will be controlled to prevent them from conducting current and thus to prevent them from outputting power to the motor. Restarting may be enabled to permit automatic or manual restarting. Accordingly, the drive controller may restart operation responsive to a user command or automatically once the temperature is at or below the first temperature threshold unless the shutdown cause was a high load fault, and only once the temperature is at or below the second temperature threshold if the shutdown cause was a high load fault. In one example, the first temperature threshold is in a range between and including 75 and 90 degrees Celsius and the second temperature threshold is in a range between and including 60 and 75 degrees Celsius. In a further example, the first temperature threshold is in a range between and including 75 and 85 degrees Celsius and the second temperature threshold is in a range between and including 65 and 75 degrees Celsius. In a yet further example, the first temperature threshold is in a range between and including 78 and 82 degrees Celsius and the second temperature threshold is in a range between and including 68 and 72 degrees Celsius. The first temperature threshold may comprise about 80 degrees Celsius and the second temperature threshold may comprise about 70 degrees Celsius. The two-level temperature lockout algorithm protects the inverter to a higher degree by requiring a lower restart threshold in case of a high load fault.

Advantageously, use of the temperature control logic limits the time the power switches operate at temperatures higher than the second temperature threshold after high load conditions, which may increase the life expectancy of the power switches.

Figure 2:
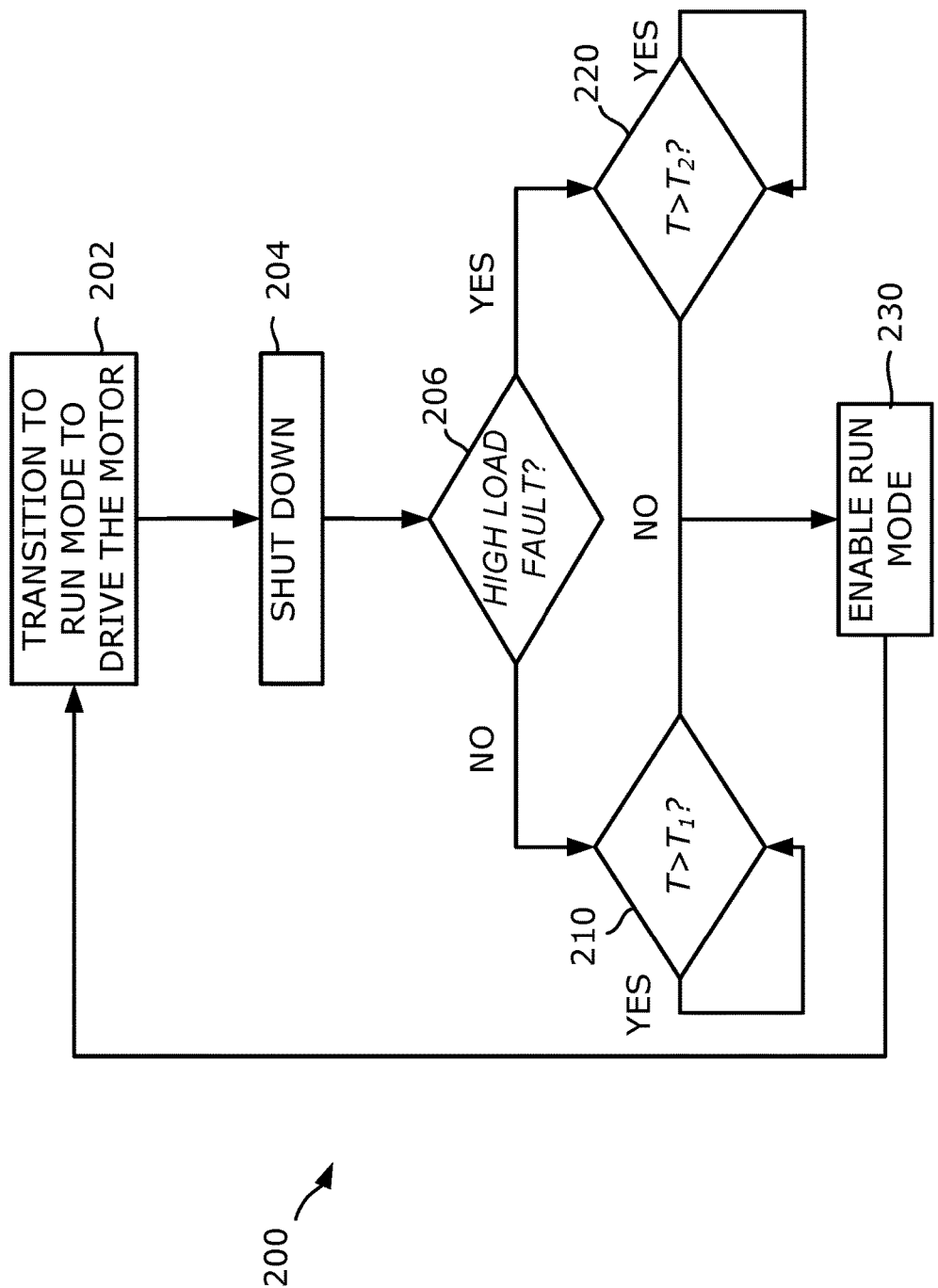
FIG. 2 is a flowchart of a method to protect the inverter of FIG. 1.

FIG. 2 is a flowchart 200 illustrating an embodiment of a method to protect an inverter and implemented by control logic in a motor drive. The method begins at 202 when the motor drive transitions to a run mode to drive a motor coupled to the motor drive. In the run mode the motor drive regulates the speed of the motor by providing respective control signals to the inverter.

In the run mode the motor drive monitors a plurality of inputs and shuts down the inverter, at 204, if it detects a high load fault, other faults, or receives a command to shut down.

At 206, responsive to the inverter being shut down, the temperature control logic determines if the shut down was due to a high load fault. If not due to a high load fault, at 210 it compares a temperature associated with the inverter to a first temperature threshold $T_1$ and if the temperature is not greater than $T_1$, at 230 it enables the run mode so that the motor drive may restart. On the other hand, if the shut down is due to a high load fault, it compares the temperature to a second temperature threshold $T_2$ and if the temperature is not greater than $T_2$, at 230 it enables the run mode so that the motor drive may restart. $T_1$ is greater than $T_2$. In both cases, if the temperature is greater than the corresponding threshold the control logic prevents restarting of the inverter.

In one variation, the temperature control logic provides a temperature lockout mode of operation having a first stage and a second stage. Once the temperature lockout mode is entered, the temperature control logic prevents restarting of the inverter unless the conditions permit exiting the temperature lockout mode, so long as the faults are not reset, for example by powering down the motor drive. The temperature control logic monitors transitions from a first state, in which the inverter is operating, to a second state, when the inverter is not operating and is shut down, and determines the shut down cause. If the cause is unrelated to a high load fault, the temperature control logic enters the first stage of the lockout mode. If the cause is a high load fault, the temperature control logic enters the second stage of the lockout mode. As used herein the high load fault is an actual fault in the inverter, or a fault determined by drive controller 106 to be a high load fault. To exit the first stage a temperature associated with the inverter must be equal to or lower than a first temperature threshold, and to exit the second stage the temperature associated with the inverter must be equal to or lower than a second temperature threshold. Examples of the first and second temperature thresholds are described elsewhere in the present application.

In some embodiments, a method to protect an inverter is implemented by control logic and comprises determining a temperature associated with the inverter; enabling restarting of the the inverter responsive to the temperature being less than or equal to a first temperature threshold and the inverter not having been shut down due to a high load fault; enabling restarting of the inverter responsive to the temperature being less than or equal to a second temperature threshold and the inverter having been shut down due to a high load fault, and preventing restarting of the inverter otherwise. The control logic may be comprised by a motor drive comprising the inverter.

The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. A non-transitory computer-readable medium, or memory, may include random access memory (RAM), read-only memory (ROM), erasable programmable read-only memory (e.g., EPROM, EEPROM, or Flash memory), or any other tangible medium capable of storing information.

Unless otherwise expressly stated in connection with a specific use thereof, the term "device" includes a single device, a plurality of devices, two components integrated into a device, and any variations thereof. The singular form is only used to illustrate a particular functionality and not to limit the disclosure to a single component. Therefore, the term "memory device" includes any variation of electronic circuits in which processing instructions executable by a processing device may be embedded unless otherwise expressly stated in connection with the specific use of the term. For example, a memory device includes read only memory, random access memory, a field programmable gate array, a hard-drive, a disk, flash memory, and any combinations thereof, whether physically or electronically coupled. Similarly, a controller includes, for example, a central processing unit, a math processing unit, a plurality of processors on a common integrated circuit, and a plurality of processors operating in concert, whether physically or electronically coupled. Furthermore and in a similar manner, the term "application" includes a single application, a plurality of applications, one or more programs or subroutines, software, firmware, and any variations thereof suitable to execute instruction sequences with a processing device.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. An alternating-current (AC) motor drive comprising:
   an input connectable to a power source and an output connectable to an AC motor;
   a direct current (DC) link;
   an inverter including power switches electrically coupled to receive a DC power from the DC link and operable to control an output voltage available at the output to supply the AC motor;
   a drive controller configured to (a) generate a command signal to drive the AC motor at a variable speed based on a process variable and a process setpoint, and (b) disable the output voltage of the inverter upon determining the occurrence of a high load condition based on at least one of a current value, a power value, or a torque value;
   a power module comprising a modulation controller communicatively coupled to the drive controller and the power switches configured to modulate the DC link voltage into the output voltage responsive to the command signal,
   wherein the drive controller comprises temperature control logic configured to compare a temperature value to a first temperature threshold and to prevent restarting the output voltage of the inverter if the temperature value exceeds the first temperature threshold, and to compare the temperature value to a second temperature threshold that is smaller than the first temperature threshold and prevent restarting the output voltage of the inverter if the temperature value exceeds the second temperature threshold and the output voltage of the inverter was disabled due to the high load condition.

2. The AC motor drive of claim 1, further comprising a rectification circuit electrically connected between the input and the DC link to convert an AC power supplied by the power source into the DC power.

3. The AC motor drive of claim 1, further comprising a temperature sensor to provide a signal indicative of the temperature value.

4. The AC motor drive of claim 3, wherein the temperature sensor is embedded in the power module.

5. The AC motor drive of claim 1, wherein the first temperature threshold is comprised in a range between and including 75 and 90 degrees Celsius and the second temperature threshold is comprised in a range between and including 60 and 75 degrees Celsius.

6. The AC motor drive of claim 5, wherein the first temperature threshold is comprised in a range between and including 75 and 85 degrees Celsius and the second temperature threshold is comprised in a range between and including 65 and 75 degrees Celsius.

7. The AC motor drive of claim 6, wherein the first temperature threshold comprises about 80 degrees Celsius and the second temperature threshold comprises 70 degrees Celsius.

8. An alternating-current (AC) motor drive comprising:
a converter;
a DC link electrically connected to the converter;
an inverter; and
a drive controller configured to control the inverter including by disabling an output voltage of the inverter in response to a high load condition based on at least one of a current value, a power value, or a torque value, and including temperature control logic configured to compare a temperature value to a first temperature threshold and to prevent restarting the output voltage of the inverter if the temperature value exceeds the first temperature threshold, and to compare the temperature value to a second temperature threshold that is smaller than the first temperature threshold and prevent restarting the output voltage of the inverter if the temperature value exceeds the second temperature threshold and the output voltage of the inverter was disabled due to the high load condition.

9. The AC motor drive of claim 8, further comprising a temperature sensor communicatively coupled to the drive controller and providing a signal indicative of the temperature value.

10. The AC motor drive of claim 9, wherein the temperature sensor is embedded in the inverter.

11. The AC motor drive of claim 9, wherein the inverter comprises power switches including silicone junctions, and wherein the temperature sensor is coupled to a silicone junction to sense a junction temperature.

12. The AC motor drive of claim 9, wherein the drive controller is configured to disable the output voltage of the inverter upon detecting the high load condition, and to enable the output voltage of the inverter upon the temperature value being greater than the second threshold but less than the first threshold if the output voltage of the inverter was disabled for any reason except the high load condition.

13. A method to protect an inverter, the method comprising:
by control logic operable to control the inverter:
determining a temperature value of a temperature associated with the inverter;
disabling an output voltage of the inverter upon determining an occurrence of a high load condition based on at least one of a current value, a power value, or a torque value;
preventing output of the output voltage of the inverter if the temperature value exceeds a first temperature threshold; and
preventing output of the output voltage of the inverter if the temperature value exceeds a second temperature threshold that is smaller than the first temperature threshold and the output voltage of the inverter was disabled due to the high load condition.

14. The method of claim 13, wherein determining a temperature associated with the inverter is performed in a substantially continuous manner.

15. The method of claim 13, further comprising storing an indication of the high load condition and analyzing the indication and the temperature to determine whether to enable the output voltage of the inverter.

\* \* \* \* \*